United States Patent Office 3,350,415
Patented Oct. 31, 1967

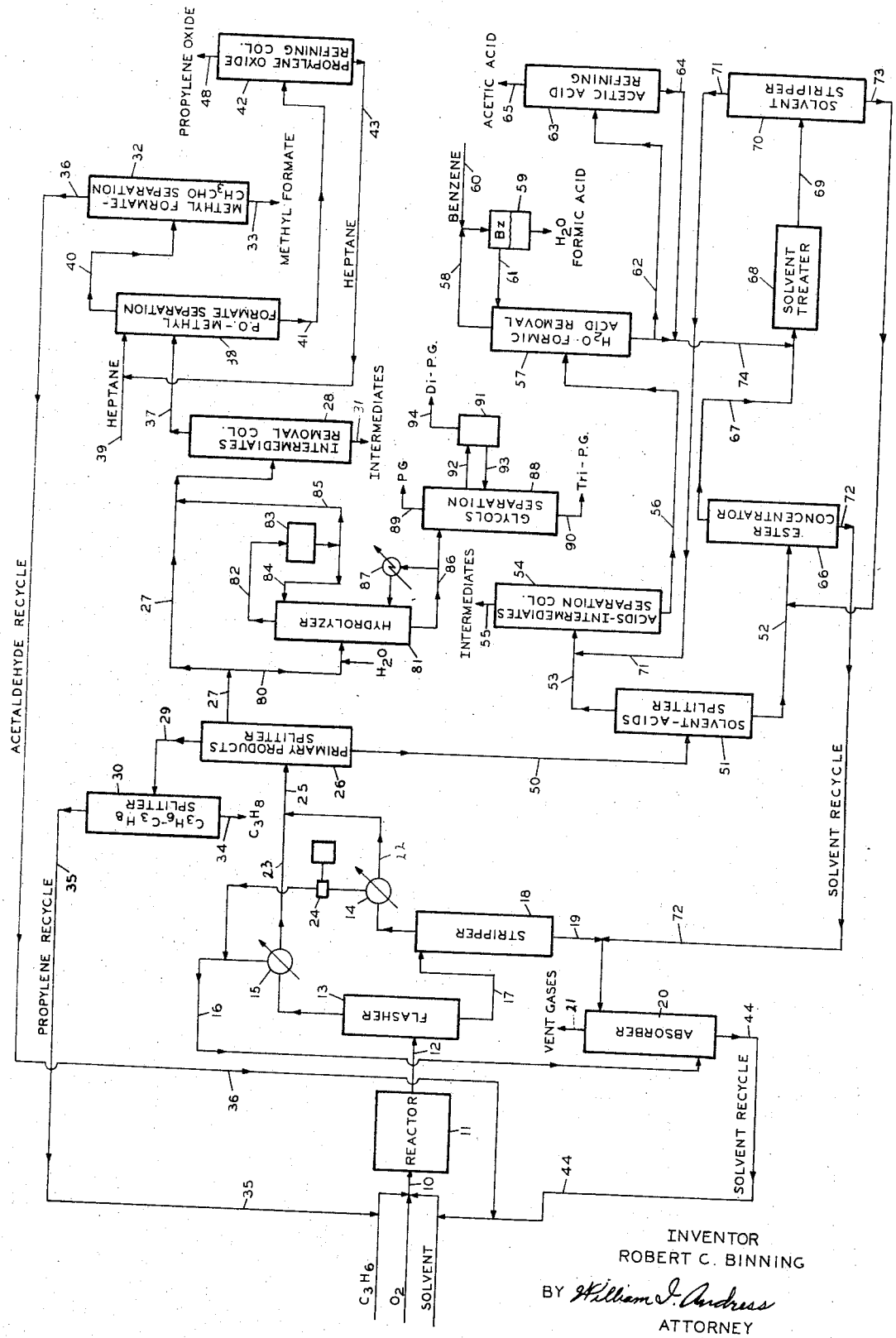

3,350,415
PRODUCTION AND RECOVERY OF OXYGENATED HYDROCARBONS BY PLURAL DISTILLATION
Robert C. Binning, St. Louis, Mo., assignor to Monsanto Company, a corporation of Delaware
Filed Feb. 12, 1964, Ser. No. 344,366
13 Claims. (Cl. 260—348.5)

ABSTRACT OF THE DISCLOSURE

This invention relates to a process for the production and recovery of propylene oxide, acetic acid and/or propylene glycols(s) as primary products involving the direct oxidation of propylene feed-stocks with molecular oxygen in a liquid reaction medium comprising fully esterified polyacyl esters of polyhydroxyalkanes, polyhydroxycycloalkanes, polyglycols or mixtures thereof, while controlling polymeric residue concentrations substantially constant by adjusting reaction conditions for a predetermined product distribution and recovering said primary products and other valuable propylene oxidation products by means of parallel and serial distillation separation zones. A hydrolysis system is employed to convert a portion of the formed propylene oxide to propylene glycol(s). Utilization of by-product glycols, monoesters and acids is made to regenerate said solvent reaction medium in an esterification reactor and this solvent, by-product acetaldehyde and unreacted propylene are recycled to the oxidation reactor for further use.

The present invention relates to the production and recovery of commercially valuable chemicals. In broad aspect, the present invention relates to the production and recovery of aliphatic organic oxygenated compounds by the liquid phase oxidation of lower aliphatic hydrocarbons rich in olefins. Another aspect of this invention relates to the non-catalytic liquid phase oxidation of olefins with molecular oxygen and recovery of the more valuable oxidation products. In one preferred aspect, the present invention relates to the non-catalytic direct oxidation of propylene with molecular oxygen in a unique liquid phase, described hereinafter, and the recovery of valuable oxidation products. In its most preferred aspect the present invention relates to the controlled non-catalytic, direct oxidation of propylene with molecular oxygen in a liquid phase comprising fully esterified polyacyl esters of polyols, and to the recovery of propylene oxide and acetic acid as the primary product species, and other oxidation products such as acetaldehyde, methyl formate, etc.

A particular feature of this invention is the flexibility of the oxidation process which can be controlled to produce greater or lesser yields of the desired commercially valuable end product(s) relative to each other. Another aspect of the feature just mentioned is the controllability of the process to produce and recover maximum yields of commercially valuable products, while minimizing yields of less-valuable oxygenated products of the reaction. The commercial value of such flexibility in a hydrocarbon oxidation process is apparent. For example, at any one time there may be great commercial demand for a particular product of the oxidation, say, propylene oxide, while at the same time the demand for another product of the reaction, say acetic acid, is low. According to the present invention, the oxidation is controllable to produce a minimum of acetic acid and a maximum of propylene oxide. The reverse situation is likewise true. Alternatively, where commercial demand warrants it, the present process is controllable to produce maximum yields of propylene oxide and acetic acid at the expense of other less valuable oxidation products, but not of each other.

A further feature of the invention involves the utilization of oxidation products to produce still other valuable compounds in quantity, e.g., propylene glycol and its esters and to regenerate solvents used as an oxidation reaction medium.

In the liquid phase oxidation of aliphatic hydrocarbons such as olefins and paraffins or mixtures of these with molecular oxygen, a great variety of oxygenated products are produced, e.g., acids, alcohols, aldehydes, esters, ketones, epoxides, glycols, etc. A great amount of research effort has been expended in attempts to develop commercially feasible hydrocarbon oxidation processes. These research efforts have been divided generally into two categories, viz., (1) hydrocarbon oxidation reactions, per se, which seek to determine operable and optimum conditions for oxidizing specific hydrocarbons to specific oxygenated products and (2) specific recovery systems for various of the myriad oxidation products.

In order to illustrate typical prior art approaches to hydrocarbon oxidation and product recovery processes, the discussion below is an attempt to illustrate the problems encountered as well as to set the background for the present invention.

Since the present invention is concerned with a novel liquid phase hydrocarbon oxidation and product recovery system, the discussion below will be directed to typical existing prior art schemes for liquid phase hydrocarbon oxidation and product recovery systems. These prior art processes describe a variety of approaches to a proper balancing of a series of reaction variables in order to obtain the desired oxygenated product, e.g., epoxides, alcohols, acids, esters, etc. For example, various specific oxidation catalysts, catalyst-solvent, or catalyst-promoter-solvent systems have been described (U.S. Patents 2,741,623, 2,837,424, 2,974,161, 2,985,668 and 3,071,601); another approach is the incorporation of oxidation anti-catalysts which retard certain undesirable side reactions (U.S. Patent 2,279,470); still another approach emphasizes the use of water-immiscible hydrocarbon solvents alone, or in the presence of oxidation catalysts and/or polymerization inhibitors such as nitrobenzene (U.S. Patent 2,780,635); or in the presence of saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometery of the reaction zone (U.S. Patents 2,530,509 and 2,977,374). The foregoing represent prior art approaches to problems encountered in the utilization of a liquid phase in hydrocarbon oxidation processes.

While the addition of various additives in some prior art processes may accomplish the purpose for which they were used, e.g., neutralization of acid by addition of alkaline substances, the additives themselves introduce other problems and disadvantages into a process. For example, in the liquid phase oxidation of olefins with molecular oxygen, organic acids, such as acetic and formic acids, are formed. The latter acid, in substantial quantities, is recognized as being deleterious in the reaction. Hence, prior art effects have been directed to selectively removing the deleterious formic acid from the relatively innocuous acetic (or other organic acids) or to the removal of all acidic components from the reaction mixture. Commonly, these acids are neutralized by the addition of alkaline materials to the main oxidation reactor and/ or to auxiliary acid extraction vessels. Typical alkaline materials added include alkali metal hydroxides and carbonates, alkaline earth oxides, hydroxides and carbonates, mildly basic heavy metal hydroxides, ammonium hydrates and metal hydrides, salts of weak acids, e.g., acetic acid and other carboxylates such as metal salts of tartaric, stearic, oleic and palmitic acids. However, the use of these basic materials presents additional process problems. For example, many alkaline materials form insoluble salts with the organic acids and as these salts continue to accumulate, control of the main oxidation reaction is rendered more difficult. Consequently, salt removal systems, e.g., filters, evaporators, crystallizers, solvent extractors and the like, must be incorporated into the process apparatus. On the other hand, use of soluble alkaline substances leads to the formation of colored or resinous materials which cause gumming of apparatus components.

It is, therefore, an object of the present invention to provide a liquid phase hydrocarbon oxidation process for the production and recovery of valuable oxygenated products, which process is free of numerous limitations recited in prior art processes.

An object of this invention is to provide a non-catalytic direct oxidation of olefin-rich hydrocarbon mixtures with molecular oxygen in a liquid phase comprising fully esterified polyacyl esters of polyols to produce and recover valuable oxygenated products.

Another object of the invention is to provide a hydrocarbon oxidation process wherein primary oxidation species can be utilized to control product distributions and ratios, generate other useful compounds, per se, and/or regenerate solvents used as an oxidation reaction medium. Yet another object of the invention is the elimination of numerous apparatus and/or process requirements of previous hydrocarbon oxidation processes.

A further object of this invention is to provide a liquid phase propylene oxidation process for the controlled production and recovery of propylene oxide, acetic acid and other valuable oxygenated products, which process is not dependent upon the presence or absence of any catalyst; nor is it dependent upon the presence of water-immiscible solvents or upon solvents containing added buffers or acid neutralizers or other additives or secondary treatments with alkaline materials to remove acidic components; nor it is dependent upon the presence of saturated compounds, initiators, promoters or anticatalysts; further, it is not dependent upon critical pH levels of the reaction mixture or geometries.

These and other objects will become apparent as the description of the invention proceeds.

The invention will be more fully understood by reference to the accompanying drawing which constitutes a part of the present invention.

In the figure is shown a diagrammatic flow sheet illustrating a preferred embodiment of the invention.

The present invention comprises the production of propylene oxide, acetic acid and other valuable oxygenated products by the controlled direct oxidation of propylene with molecular oxygen in the liquid phase, and to a novel means of separating and recovering these products.

The liquid phase in which the oxidation occurs comprises solvents which are essentially chemically indifferent, high boiling with respect to volatile oxidation products and are oxidatively and thermally stable under the condition of the reaction described. Further, the solvents employed in the present invention are highly resistant to attack by free radicals which are generated in the oxidation process. Moreover, the solvents employed in the instant invention are effective in assuaging the deleterious effects of acidic components, especially formic acid and to a lesser degree acetic acid, on non-acidic coproducts, e.g., propylene oxide, which are formed in the oxidation of olefins. This assuaging effect is achieved, in part, by a proton solvation of the acidic components by the solvent which results in an "acid-leveling" which, in turn, permits substantially complete retention of the propylene oxide formed in the oxidation.

Solvents primarily and preferably contemplated herein comprise fully esterified polyacyl esters of polyhydroxyalkanes, polyhydroxycycloalkanes, polyglycols and mixtures thereof. Polyacyl esters contemplated herein contain, generally, from 1 to 18 carbon atoms in each acyl moiety and from 2 to 18 carbon atoms in each alkylene or cycloalkylene moiety. However, best results obtain when the acyl moiety contains from 1 to 6 carbon atoms and the alkylene and cycloalkylene moiety each contains from 2 to 16 carbon atoms. These esters may be readily prepared by methods known to the art. For example, in U.S. Patent 1,534,752 is described a method whereby glycols are reacted with carboxylic acids to produce the corresponding glycol ester. Acid anhydrides may be used in place of the acids.

Representative glycols include straight-chain glycols, such as ethylene glycol, propylene glycol, butylene glycol, pentylene glycol, hexylene glycol, heptylene glycol, octylene glycol, nonylene glycol, decylene glycol, dodecylene glycol, pentadecylene glycol and octadecylene glycol. Branched-chain glycols such as the iso-, primary, secondary and tertiary isomers of the above straight chain glycols are likewise suitable, e.g., isobutylene glycol, primary, secondary, and tertiary amylene glycols, 2-methyl-2,4-pentanediol, 2-ethyl-1,3-hexanediol, 2,3-dimethyl-2,3-butanediol, 2-methyl-2,3-butanediol and 2,3-dimethyl-2,3-dodecanediol. Polyalkylene glycols (polyols) include diethylene glycol, dipropylene glycol, tripropylene glycol, tetrapropylene glycol and dihexylene glycol.

In addition to straight and branched-chain glycols, alicyclic glycols such as 1,2-cyclopentanediol, 1,2-cyclohexanediol, 1-methyl-1,2-cyclohexanediol and the like may be used.

Other suitable hydroxy compounds include polyhydroxy alkanes, such as glycerol, erythritol and pentaerythritol and the like.

Representative carboxylic acids include fatty acids such as formic acid, acetic acid, propionic acid, butyric acid, valeric acid, caproic acid, caprylic acid, lauric acid, palmitic acid, stearic acid, naphthenic acids, such as cyclopentane carboxylic acid, cyclohexane carboxylic acid, and aromatic acids such as benzoic acid and the like.

Representative polyacyl esters include polyacyl esters of polyhydroxy alkanes, such as triacyl esters of glycerol, e.g., glycerol triacetate; tetraacyl esters of erythritol and pentaerythritol, e.g., erythritol tetraacetate and penaerythritol tetraacetate and the like, and polyacyl esers of polyalkylene glycols (polyglycols), such as diethylene glycol diacetate, dipropylene glycol diacetate, tetraethylene glycol diacetate and the like. These polyacyl ester solvents may be used individually or as mixtures, being compatible with each other. For example, a mixture of varying proportions of a diacyl ester of a hydroxyalkane, such as propylene glycol diacetate, and a polyacyl ester of a polyglycol, such as dipropylene glycol diacetate, may be used. Or, a mixture of a polyacyl ester of a polyglycol, such as dibutylene glycol dibutyrate, and a polyacyl ester of a polyhydroxy alkane, such as glycerol trivalerate, or pentaerythritol tetrapropionate may be used as the solvent in the instant process illustrated in the examples below.

Of particular interest in the present process are the vicinal diacyl esters of alkylene glycols, such as the diformates, diacetates, dipropionates, dibutyrates, divalerates, dicaproates, dicaprylates, dilaurates, dipalmitates and distearates, and mixtures thereof, of the alkylene and polyalkylene glycols recited above. Still more particularly, of greater interest are the diacetates of ethylene and propylene glycols used individually or in admixtures of any proportion.

Polyacyl esters having mixed acyl groups are likewise suitable, e.g., ethylene glycol formate butyrate, propylene glycol acetate propionate, propylene glycol butyrate propionate, butylene glycol acetate caproate, diethylene glycol acetate butyrate, dipropylene glycol proprionate caproate, tetraethylene glycol butyrate caprylate, erythritol diacetate dipropionate, pentaerythritol dibutyrate divalerate, glycerol dipropionate butyrate and cyclohexanediol acetate valerate.

Monoacyl esters of polyhydroxyalkanes and polyglycols are unsuitable for use as a reaction medium according to the present process. The same is true of other hydroxy or hydroxylated compounds such as glycerin, glycols, polyglycols and hydroxy carboxylic acids. This is due to the presence of an abundance of reactive hydroxyl groups which are susceptible to autooxidative attack, hence, introduce a concomitant oxidation side reaction which competes with the desired direct oxidation of the olefin, and too, these hydroxyl groups when esterified with organic acids present, produce water which together with water normally formed in the reaction provide quantities sufficient to inhibit the oxidation of the olefin to the olefin oxide and/or to hydrolyze the olefin oxide present.

In the preferred mode of operation the polyacyl esters used herein constitute the major proportion of the liquid reaction medium with respect to all other constituents including reactants, oxidation products and co-products dissolved therein. By major is meant that enough solvent is always present to exceed the combined weight of all other constituents. However, it is within the purview of this invention, although a less preferred embodiment, to operate in such manner that the combined weight of all components in the liquid phase other than polyacyl esters exceeds that of the polyacyl ester solvent. For example, a refinery grade hydrocarbon feedstock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including the olefin oxide, intermediates such as acetone and methyl acetate, and high boilers (components having boiling points higher than that of the polyacyl ester solvent) formed in the reaction and/or recycled to the reactor may constitute as much as 75% by weight of the liquid reaction medium, according to reaction conditions or recycle conditions.

When carrying out the invention according to the less preferred mode of operation, the quantity of polyacyl ester solvent present in the liquid reaction medium should be not less than 25% by weight of said medium in order to advantageously utilize the aforementioned benefits characteristic to these unique olefin oxidation solvents and facilitate product recovery.

In further embodiments of the present invtion for oxidizing olefins with molecular oxygen in the liquid phase, the polyacyl ester solvents are suitably used in combination with diluents or auxiliary solvents which are high boiling with respect to volatile oxidation products, are relatively chemically indifferent and oxidatively and thermally stable under reaction conditions. Here, too, the polyacyl ester solvents should be utilized in quantities not less than 25% by weight of the liquid reaction medium in order to retain the superior benefits of these polyacyl ester solvents in liquid phase olefin oxidations and facilitate prodct recovery.

Suitable diluents which may be utilized with the polyacyl ester solvents of this invention include, e.g., hydrocarbon solvents such as xylenes, kerosene, biphenyl and the like; halogenated benzenes such as chlorobenzenes, e.g., chlorobenzene and the like; dicarboxylic acid esters such as dialkyl phthalates, oxylates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; diaryl sulfoxides, e.g., diphenyl sulfoxide; dialkyl and diaryl sulfones, e.g., dimethyl sulfone and dixylyl sulfone and nitroalkanes, e.g., nitrohexane. While the foregoing have been cited as typical diluents which may be used in combination with the polyacyl ester solvents in this invention, it is to be understood that these are not the only diluents which can be used. In fact, the benefits accruing from the use of these polyacyl esters can be utilized advantageously when substantially any relatively chemically indifferent diluent is combined therewith.

Therefore, the present invention in its broadest use comprehends the oxidation of olefin-containing feedstocks in a liquid reaction medium consisting essentially of at least 25% by weight based on said medium of at least one fully esterified polyacyl ester described above and the recovery of oxidation products.

In any case, the liquid reaction medium referred to herein is defined as that portion of the total reactor content which is in the liquid phase.

It is therefore apparent that the liquid reaction media contemplated herein possess not only those characteristics described in prior art solvents, viz., they are high boiling with respect to volatile oxidation products under the conditions of reaction, essentially chemically indifferent and oxidatively and thermally stable, but in addition, possess characteristics not described in prior art oxidations, viz., resistance to free radical attack, the ability to reduce and/or eliminate the deleterious effects of acidic components by proton solvation and/or ester interchange. In addition, due to the facile manner in which the present oxidation proceeds in the described solvents, no oxidation catalysts, promoters, initiators, buffers, neutralizers, polymerization inhibitors, etc. are required as in many prior art processes.

As noted above, no added catalysts are required in the present oxidation process. However, due to the versatility of the above-described solvents in olefin oxidations, the usual oxidation catalysts can be tolerated although usually no significant benefit accrues from their use. For example, metalliferous catalysts such as platinum, selenium, vanadium, iron, nickel, cobalt, cerium, chromium, manganese, silver, cadmium, mercury and their compounds, preferably in the oxide form, etc., may be present in gross form, supported or unsupported, or as finely divided suspensions.

In like manner, since the olefin oxidations according to this invention proceed at a rapid rate after a brief induction period, no initiators or promoters are required, but may be used to shorten or eliminate the brief induction period, after which no additional initiator or promoter need be added.

Suitable initiators include organic peroxides, such as benzoyl peroxide; inorganic peroxides, such as hydrogen and sodium peroxides; peracids, such as peracetic and perbenzoic acids; ketones, such as acetone; ethers, such as diethyl ether; and aldehydes, such as acetaldehyde, propionaldehyde and isobutyraldehyde.

Use of the solvents described herein being free of the necessity to use various additives described in prior art processes, enhances the separation and recovery of propylene oxides by the sequence of steps described in detail below.

In carrying out the process of the instant invention, the reaction mixture may be made up in a variety of ways. For example, the olefin and oxygen may be pre-mixed with the solvent and introduced into the reactor, or the olefin may be premixed with the solvent (suitably, up to 50% by weight based on the solvent and, preferably, from 5 to 30% by weight based on the solvent). Preferably, the olefin is pre-mixed with the solvent and the oxygen-containing gas introduced into the olefin-solvent mixture incrementally, or continuously, or the olefin and oxygen-containing gas may be introduced simultaneously through separate or common feedlines into a body of the solvent in a suitable reaction vessel (described below). In one embodiment an olefin and oxygen-containing gas mixture is introduced into the solvent in a continuously stirred tank reactor, under the conditions of temperature and pressure described below. Suitable olefin:oxygen volumetric ratios are within the range of 1:5 to 15:1. Feed rates, generally, may vary from 0.5 to 1500 ft.³/hr., or higher, and will largely depend upon reactor size. The oxygen input is adjusted in such manner as to prevent an excess of oxygen (>1%) in the off-gas or above the reaction mixture. Otherwise, a hazardous concentration of explosive gases is present. Also, if the oxygen (or air) feed rate is too high the olefin will be stripped from the mixture, thus reducing the concentration of olefin in the liquid phase and reducing the rate of oxidation of the olefin, hence giving lower conversions per unit time.

Intimate contact of the reactants, olefin and molecular oxygen in the solvent is obtained by various means known to the art, e.g., by stirring, shaking, vibration, spraying, sparging or other vigorous agitation of the reaction mixture.

The olefin feed stocks contemplated herein include pure propylene, mixtures of propylene with other olefins, e.g., ethylene, or olefin stocks containing as much as 50% or more of saturated compounds, e.g., propane. Olefinic feed materials include those formed by cracking hydrocarbon oils, paraffin wax or other petroleum fractions such as lubricating oil stocks, gas oils, kerosenes, naphthas and the like.

The reaction temperatures and pressures are subject only to those limits outside which substantial decomposition, polymerization and excessive side reactions occur in liquid phase oxidations of propylene with molecular oxygen. Generally, temperatures of the order of 50° C. to 400° C. are contemplated. Temperature levels sufficiently high to prevent substantial build-up of any hazardous peroxides which form are important from considerations of safe operation. Preferred temperatures are within the range of from 140° C. to 250° C. Still more preferred temperatures are within the range of from 160° C. to 210° C. Suitable pressures herein are within the range of from 0.5 to 350 atmospheres, i.e., subatmospheric, atmospheric or superatmospheric pressures. However, the oxidation reaction is facilitated by use of higher temperatures and pressures, hence, the preferred pressure range is from 5 to 200 atmospheres. Still more preferred pressures are within the range of from 25 to 75 atmospheres. Pressures and temperatures selected will, of course, be such as to maintain a liquid phase.

The oxidation of olefins, e.g., propylene, in the present process is auto-catalytic, proceeding very rapidly after a brief induction period. A typical oxidation of propylene in a batch run requires from about 1 to 20 minutes. Similar, or faster, reaction rates obtain in continuous operation, e.g., as low as 0.1 min. reactor residence time.

The reaction vessel may consist of a wide variety of materials. For example, aluminum, silver, nickel, almost any kind of ceramic material, porcelain, glass, silica and various stainless steels, e.g. Hastelloy C., are suitable. It should be noted that in the instant process where no added catalysts are necessary, no reliance is made upon the walls of the reactor to furnish catalytic activity. Hence, no regard is given to reactor geometry to furnish large-surface catalytic activity.

The oxidation products are removed from the reactor, preferably, as a combined liquid and gaseous mixture, or the liquid reaction mixture containing the oxidation products is removed to a products separation system, a feature of which comprises in combination a flasher-stripper let-down arrangement. This arrangement in combination with the proceding propylene oxidation reaction and with succeeding product-separation steps constitutes a unique, safe, simple, economic and practical process for the commercial production and recovery of olefin oxides.

In regard to the flasher-stripper let-down system, principal advantages accruing from its use are that the system simultaneously (1) utilizes the heat of the oxidation reaction in the initial separation of gaseous and liquid products; this eliminates the need of cooling the reactor effluent, (2) minimizes the amount of overhead solvent consistent with the maximum amount of olefin oxide, e.g., propylene oxide (P.O.) all of which goes overhead, (3) minimizes the amount of total overhead solvent, resulting in a reduced solvent load on subsequent distillation columns. The advantages of this reduced solvent load are that smaller columns are required for the requisite products separation, (4) reduces to trace amounts the quantity of acidic components (most importantly, formic acid) in solvent recycle streams, and (5) removes the bulk of the fixed gases and very volatile components, thus reducing the pressure requirements to prevent excessive loss of product in subsequent processing steps.

A particular feature of the flasher-stripper let-down combination is that in the flasher an initial separation of about one-third of the acids formed in the reaction is accomplished and these are taken overhead; and by use of a stripping column for treatment of the flasher bottoms, substantially all of the remaining acids, i.e., all but about 0.05 to 0.2 wt. percent based on the recycle stream are removed from the recycle solvent. Advantages afforded by such clean separation of acid values, particularly highly corrosive formic acid, from the recycle solvent are that all equipment for processing the stripper bottoms can now be made of plain inexpensive carbon steel, replacing very expensive corrosion resistant stainless steels such as Hastelloy C., and the like, hitherto required. The economic advantages are manifest. Additionally, acids such as formic acid which are known to have an adverse effect upon the yield of olefin oxides in the primary oxidation reaction, as discussed above, are no longer made available, by means of recycle solvent in quantities sufficient to exert a deleterious effect on olefin oxide yield.

The total effect of the foregoing advantages is to provide an efficient, rapid economical method for stabilizing the propylene oxide reaction mixtures while unloading solvent from the oxidation products and recycling solvent to the reactor.

In contrast to the flasher-stripper combination used herein the use of individual flashers or distillation columns in the initial separation of the products from the reactor effluent is inadequate for various reasons. For example, a single flasher cannot simultaneously minimize the quantity of overhead solvent, hence reducing the liquid load in the distillation columns in the separation train, while minimizing the amount of propylene oxide in the bottoms stream recycled to the main reactor. If conditions of temperature and pressure in a single flasher are so adjusted as to permit the desired amount of solvent to go overhead, a large amount of acids (15 wt. percent or more) appear in the bottoms stream and are recycled to the reactor. Moreover, in using a single flasher substantial quantities of propylene oxide (on the order of 30–40% of that produced) are taken as bottoms and recycled to the reactor thus reducing total yield, whereas in the present flasher-stripper combination virtually all of the formed propylene oxide is removed from the recycle stream.

Further, when a single distillation column is used in the initial gas-liquid separation of reactor effluent this column must be approximately five times as large in cross sectional area as that column used herein into which the combined overhead streams of the flasher and stripper are fed. In feeding the gas-liquid effluent directly into a distillation column a large amount of fixed gases are present, thus reducing plate efficiency and requiring additional plates which materially adds to the cost of operation. A further disadvantage of having large quantities of fixed gases in a distillation column adjacent to the reactor is that much higher pressure and refrigerants (as opposed to cooling water) are required to condense overhead gases.

On the other hand, use of a plurality of distillation or stripping columns to effect an initial gas-liquid separation of the reactor effluent is disadvantages primarily because of the required increase in product hold-time in these columns. This increased hold-time necessitates longer exposure of the desired propylene oxide to the deleterious action of formic acid and/or undesired secondary reactions with co-products as by hydrolysis, esterification, polymerization or decomposition. In addition, when no flashers are used the total reactor effluent is loaded into these distillation columns thus requiring equipment of increased capacity and separation efficiency. Elimination of a flasher, moreover, increases capital outlay since distillation columns are much more expensive than flashers.

The flasher-stripper let-down combination used herein is in like manner superior to let-down arrangements comprising a plurality of flashers for a number of reasons. Primarily, by use of a flasher-stripper combination greater control and flexibility of process operation is assured, it being much easier to change product separation specifications and operations in a stripper than in a flasher. This is accomplished principally by controlling the heat input to the stripper from a reboiler. Since a flasher has only one equilibrium stage, a stripper magnifies by several stages, depending upon the number and efficiency of plates therein, the degree of separation of products achieved by flashers. Another advantage of the flasher-stripper arrangement herein over the use of plural flashers is that using e.g., a two-flasher let-down arrangement an undesirable amount of propylene oxide (on the order of 7–8% of that produced) is recycled to the main oxidation reactor, thus reducing total yield. On the other hand, using the flasher-stripper combination described herein virtually all of the propylene oxide is separated from recycle solvent. A further advantage of using a stripper in place of a second flasher is that the former removes all but a small amount, i.e., approximately 0.05 to 0.2 wt. percent, based on total recycle stream, of formed acids from the recycle solvent, whereas by use of flashers about 1–2 wt. percent of acids remain in the recycle solvent.

Bottoms from the stripper containing the bulk of the solvent and residue, i.e., components having boiling points above that of the solvent, are fed to the top of an absorber to flow downward countercurrently to a stream of uncondensed materials from the flasher and stripped overhead which is fed to a lower region of the absorber.

An important feature of the present process is the elimination of a residue removal column previously required to control the level of residue in the main oxidation reactor and, thereby, the distribution and ratios of primary oxidation products. As noted above, the liquid phase oxidation of hydrocarbons results in the production of a complex mixture of oxygenated products. For example, in the present liquid phase oxidation of propylene with molecular oxygen, over forty individual compounds have been identified. In addition to these individual compounds, a residue of polymeric material is also produced. This polymeric material is of complex composition and has not been fully characterized, but is known to contain a variety of functional groups including carboxyl, carbonyl, alkoxy and hydroxy groups. When this residue is recycled to the main oxidation reactor it tends to build up to a level which impedes the oxidation of propylene to propylene oxide, if such is the desired end product, by competing with the propylene for the available oxygen. Thus, it has previously been considered necessary to control residue levels by purging residue from the recycle solvent. Provision was therefore made to pass recycle solvent through a residue removal column.

In accordance with the present process the previously required residue removal column has been eliminated. The residue level in the reactor, and the distribution and ratios of primary oxidation products, is now controlled in the reactor itself by proper selection of reaction conditions. In the present process, the net quantity of residue in the reactor is controlled by balancing the amount of residue oxidized against the amount of residue formed in the oxidation. This control of residue levels in the reactor is a function of a combination of variables, primarily temperature, agitation, residence time and reactant ratios. More particularly, the hydrocarbon oxidation is initially set up for a given product distribution, e.g., a desired propylene oxide-acetic acid ratio. At steady state the solvent recycle stream is monitored to determine residue level. If the residue level is too high for the desired product distribution, this level can be reduced by increasing the degree of agitation and/or decreasing (1) reaction temperatures, (2) reactor residence time or (3) olefin/$O_2$ feed ratios. When either (1), (2) or (3) are done, appropriate adjustments must be made in the other two variables for optimum results. Conversely, if upon monitoring the solvent recycle stream it is found that the residue level is too low for a desired product distribution, the residue level in the reactor can be increased by reversing the above procedures used in decreasing residue levels. In this manner propylene oxide-acetic acid ratios can be obtained within the range of approximately 0.5 to 1 to 5.5 to 1.

The overhead streams from the flasher and stripper are passed to condensers from which uncondensed materials are combined and fed to an absorber. Condensable materials from the condensers are combined and fed to a primary product splitter from which unreacted propylene and propane are taken overhead to a splitter for these components wherein propylene is removed overhead and recycled to the reactor. Alternatively, the entire overhead from the primary products splitter is processed through an absorber and desorber as discussed below.

From an upper region of the primary products splitter is removed, a side stream containing propylene oxide, lower boiling components, e.g., methyl formate and acetaldehyde and some intermediate boiling components such as acetone, methyl acetate and methanol. This side stream is directed to an intermediate removal column where the intermediates are removed as bottoms and, if desired, used for various solvent purposes, e.g., as film casting solvents or as paint thinners, or else separated into individual components. Propylene oxide, methyl formate and acetaldehyde are taken overhead to an extractive distillation column in which propylene oxide is selectively separated from methyl formate (which boils within 5° C. of propylene oxide) by means of a hydrocarbon entraining agent more fully described below. Methyl formate and acetaldehyde are taken overhead to a single distillation column where methyl formate is removed as bottoms while acetaldehyde is simultaneously taken overhead (thus eliminating an additional distillation column for acetaldehyde removal prior to the propylene oxide-methyl formate separation) and recycled to the main oxidation reactor. The acetaldehyde exerts a beneficial effect on the primary oxidation by increasing propylene oxide yields based on propylene consumed. Or, when it is desired to increase acetic acid yields based on propylene consumed, this recycled acetaldehyde can be oxidized with additional oxygen to acetic acid. Bottoms from the extractive distillation column containing propylene oxide dissolved in the hydrocarbon entraining agent is fed to a propylene oxide refining zone where purified propylene oxide is stripped from the hydrocarbon solvent and taken overhead while the hydrocarbon solvent is removed as bottoms and recycled to the extractive distillation column.

Acid values and other valuable products resulting from the present oxidation process are recovered from the bottoms stream of the primary products splitter referred to above. This bottoms stream contains all of the solvent taken overhead from the flasher-stripper let-down system, acid values, water, intermediate values not removed in the primary products splitter side stream, including methanol, methyl acetate, acetone, isopropanol, allyl alcohol, biacetyl and others; and some higher boiling components, including propylene glycol and various high boiling esters of propylene glycol formed in situ, such as propylene glycol monoacetate, propylene glycol monoformate and propylene glycol acetate formate.

The primary products splitter bottoms containing the above values is passed to a solvent-acid splitter where all higher boiling components including solvent, propylene glycol and esters of propylene glycol are removed as bottoms. The treatment and utility of this bottoms stream is discussed below.

Overhead from the solvent-acid splitter containing all the acid values, all the water and all the intermediate boiling components is passed to an acids-intermediates separation column where the intermediate boilers and a small amount of water are recovered overhead. These intermediates may be separated into fractions suitable for various solvent utilities, e.g., a methanol methyl acetate, acetone fraction is useful as a paint thinner or as a film casting solvent. Alternatively, these intermediates may be separated into individual components such as those mentioned above by various extraction means such as selective adsorption and fractional desorption, solvent extraction, extractive distillation, azeotropic distillation, etc., using a suitable extractant.

Bottoms from the acids-intermediate removal column containing acetic acid, formic acid and water are passed to an azeotropic distillation column containing benzene. In this column benzene forms azeotropes with water and with formic acid which are taken overhead to a condenser cooled with cooling water. Upon condensing, water and formic acid are cleanly separated from the benzene and collected in a separator from which benzene is recycled to the azeotropic distillation column, while water and formic acid are removed as bottoms from the separator. Bottoms from the azeotropic distillation column comprising primarily acetic acid are passed to an acetic acid refining column from which purified acetic acid is recovered overhead as a final product.

Returning now to the bottoms stream from the solvent-acids splitter; as discussed above, the treatment and utility of this stream constitutes an important aspect of the present process. It has been found that various components in this stream, e.g., propylene glycol and various monoesters thereof, particularly propylene glycol monoacetate and monoformate exert deleterious effects upon the course of the reaction in the main oxidation reactor, especially when it is desired to produce propylene oxide as the primary oxidation species. These deleterious effects are due chiefly to the oxidation of these unstable compounds to undesired oxidation products, resulting ultimately in loss of propylene oxides, a more valuable product of the present process.

Accordingly, it is a feature of the instant process to convert the disadvantage of the presence of the above deleterious components in the recycle solvent to great advantage. This is accomplished by use of a solvent treating procedure following the solvent-acids splitter column. Bottoms from this column is comprised chiefly, i.e., from about 88–92 weight percent, of the solvent used in the primary oxidation reactor, e.g., propylene glycol diacetate, together with from about 8–12 weight percent of propylene glycol, glycol esters and residue. This stream is fed to an ester concentrator, distillation column the function of which is to drive the propylene glycol and glycol esters overhead in a stream rich in these components while recycling the bottoms containing residual residue and most of the solvent to the absorber, thence, to the reactor.

The overhead stream from the ester concentrator is combined with acetic acid from the bottoms of the acetic acid refining column and water-formic acid removal column and this combined stream fed to a reactor where the propylene glycol and glycol esters undergo esterification and some transesterification in the presence of an acid catalyst, e.g., toluenesulfonic acid. The effluent stream from the esterification reactor is greatly enriched in the preferred oxidation solvent of this process, viz, propylene glycol diacetate, and substantially depleted of the deleterious components referred to above.

Thus, by means of the solvent treatment operation certain deleterious products of the primary oxidation reaction can be converted to an eminently suitable oxidation solvent. Also, solvent mechanical losses which occur in the process can be made up while at the same time increasing the efficiency and controllability of the oxidation reaction.

The effluent stream from the esterification reactor is fed to a stripping column where the excess acetic acid and a small amount of water, formic acid and other products formed by the esterification and/or transesterification reaction are taken overhead and combined with the overhead from the acid-solvent splitter for further treatment. Bottoms from the stripping column comprise predominantly propylene glycol diesters, the preferred solvent herein, and a small amount of propylene glycol and monoesters. This bottoms streams is returned to the ester concentrator for further treatment as described above.

Another important feature of the present invention is the provision of an olefin oxide hydrolyzing column operating on a side stream of the primary products splitter referred to above. The composition of this side stream is described more fully in Example 1. In general, a portion of this side stream is fed to a hydrolyzer column wherein olefin oxide in the crude feed to this column is hydrolyzed primarily to the corresponding monoglycol and minor quantities of polyglycols which are removed in a water-free condition from the bottom of the tower to a glycols separation column. The overhead from the hydrolyzer containing the same components fed to this column, less the hydrolyzed olefin oxide, is refluxed to the top of the column while a product take-off stream is fed to the primary products splitter side stream going to the intermediates removal column.

By means of this hydrolysis operation the utility and flexibility of the present process is greatly increased. For example, all or any part of the olefin oxide present in the primary products splitter side stream can be hydrolyzed to the corresponding glycol. In general, however, the process is best carried out, economically and practicably, when only a portion of the olefin oxide in said side stream is hydrolyzed to glycol.

In this manner, the process is well adapted to the production and recovery of a variety of valuable compounds in predetermined distributions and ratios which are variable at will. Thus, upon demand the present process can be operated to produce, e.g., olefin oxide-glycol-acetic acid ratios in proportionate molar ratios ranging from about 0.5:1 to 5.5:1.

In its most preferred embodiment the present process is eminently adapted to the production and recovery of propylene oxide, propylene glycol and acetic acid in ratios within the above range, together with other valuable oxygenated products as described herein. This embodiment is described in detail in Example 3 below.

In the examples below are shown variant modes of hydrocarbon oxidations to produce and recover valuable commercial products. The distinctions in these oxidation processes will be pointed out and for clarity will be described with reference to the accompanying drawing in connection with the direct oxidation of propylene in a continuous operation, and to specific novel methods of separating and refining valuable oxygenated products including propylene oxide, propylene glycol, acetic acid, acetaldehyde, methyl formate, etc. arising in the process. Suitable variations in the separation trains are also disclosed. Such conventional equipment as motors, pumps, valves, gauges, reflux condensers, reboilers, safety heads and the like are not shown in the drawing, but their inclusion is a variation readily apparent to those skilled in the art.

Example 1

In this process a one-gallon Magnedrive autoclave served as the reactor portion of a continuous system. Solvent, propylene and oxygen were introduced through a bottom port directly below a Dispersimax turbine agitator operating at 1600 r.p.m. to obtain efficient mixing and internal gas recycle. The reactor was heated electrically and temperature control was maintained by modulating water flow through internal cooling coils. Reaction temperatures were continuously recorded on a strip-chart.

In operation the reactants, 92% propylene and 99% oxygen, together with propylene glycol diacetate, a preferred solvent, were fed to reactor 11, operating at 850 p.s.i.g. and 170° C. The molar feed ratio of $C_3H_6/O_2$ was 2.36. Total hold time was about 8 minutes. A variation is to provide two or more reactors in parallel operating under identical conditions and feeding the effluent from these reactors into the flasher-stripper let-down system described below.

The reaction product, a combined gas-liquid effluent, was fed continuously to flasher 13. Flasher 13 was operated at 165 p.s.i.a. pressure and 190° C. at the bottom and 170° C. at the top. From this flasher most of the low and intermediate boiling components including all unreacted propylene, $CO_2$ and at least one-half, and in this example approximately 66%, of the propylene oxide goes overhead along with about one-fourth of the acids, e.g., formic and acetic acids, all dissolved gases and about 6–8% of solvent. Bottoms from flasher 13 were fed to stripping column 18 operating at approximately 24.7 p.s.i.a. and 200° C. at the bottom and using 6 distillation plates. The residual propylene oxide, i.e., generally between 30% and 50% of that formed, and about 33% in this example, substantially all of the remaining acids, lighter components and 10–15% of the solvent were vaporized and taken overhead. Bottoms from stripper 18 containing the bulk of the solvent were fed through line 19 to absorber 20. The solvent effluent from stripper 18 contained about 38% by weight of residue, i.e., reaction products having boiling points above that of the solvent.

Overhead from flasher 13 and stripper 18 were directed to partial condensers 15 and 14, respectively, operating with cooling water. In condenser 15 uncondensables, including fixed gases, most of the $CO_2$, about 7% of the total propylene oxide, about 74% of the unreacted propylene, and propane were separated from the condensables and fed through line 16 countercurrently to the solvent bottoms from stripper 18 to absorbed 20. The uncondensables from condenser 14 containing $CO_2$, propane and propylene are either discarded if desired or, optionally compressed in compressor 24 and fed to the absorber via line 16 to recover the propylene. Absorber 20 was operated at 150 p.s.i.g. and at temperature of approximately 75° C. at the top and 95° C. at the bottom and had twenty-five plates. Fixed gases, $O_2$, $H_2$, $N_2$, $CH_4$, CO and $CO_2$ were vented from the top of the absorber. Propane, propylene, propylene oxide and other soluble components are absorbed in the solvent which is recycled to the reactor through line 44 or, alternatively, further processed for propylene purification, as will be discussed below.

The condensed liquids from condenser 14 were combined with those from condenser 15 and this combined stream containing 85% of the formed propylene oxide, most of the acids and about 20% of the solvent was fed through line 25 to primary products splitter 26, a distillation column containing 40 plates and operating at about −16° C. at the top and 145° C. at the bottom under 40 p.s.i.a. pressure and reflux ratio of 6.0.

Unreacted propylene and propane are taken overhead from column 26 to a splitter 30 for these components wherein propane is removed as bottoms and propylene is removed overhead and recycled through line 35 to the reactor. Column 30 has 75 plates and operates at 300 p.s.i.a. and is heated to 50° C. at the top and 55° C. at the bottom and uses a reflux ratio of 11.7. If desired some propane may be driven overhead by increasing the temperature at the bottom of column 30.

An alternative procedure for removing propane from recycle propylene is to combine the overhead from column 26 with the overhead stream in line 16 from condenser 15 leading to absorber 20. As mentioned previously, the liquid bottoms from the absorber containing solvent, propylene and propane may be recycled directly to the reactor or further processed for propylene purification, i.e., propane removal. When the concentration of propane in the reactor tends to build up to a level which interferes with the propylene oxidation, additional, or excess, propane is prevented from being recycled to the reactor by directing the effluent bottoms from absorber 20, wholly or partially, through a side-stream taken from line 44, e.g., by means of a distributing valve into a desorber (not shown) operated at about 50° C. at the top and 100° C. at the bottom and 300 p.s.i.a. pressure. Here, solvent is removed as bottoms and recycled to the reactor through line 44, and propane and propylene are removed overhead to a $C_3H_6$—$C_3H_8$ splitter operating at 300 p.s.i.a. and heated to about 50° C. at the top and 55° C. at the bottom. Propane is removed as bottoms and propylene of essentially the same composition as the initial feed material is recycled to the reactor propylene feed stream.

From primary products splitter 26 a side stream 27 was removed at about the fifth plate from the top of the column. The composition of this side stream was approximately 62% propylene oxide, 10% methyl formate, 7% acetaldehyde and the balance primarily intermediate boiling components including acetone, methyl acetate, methanol and a small amount of water. This side stream was directed to an intermediates removal column 28 where the intermediates were removed as bottoms. This bottoms stream can be suitably used as such in various solvent applications or further separated into individual components as discussed above. Column 28 was heated to about 33° C. at the top and 60° C. at the bottom and maintained at 15 p.s.i.a. pressure. This column had 70 plates and used a reflux ratio of 6.0.

The overhead from column 28 contained about 78% propylene oxide, 13% methyl formate and 9% acetaldehyde. This overhead stream 37 was passed to a methyl formate removal zone 38. In the present embodiment column 38 was an atmospheric (15 p.s.i.a.) extractive distillation column having 50 plates and operating at about 28° C. at the top and 47° C. at the bottom. As entraining agent a hydrocarbon solvent boiling above 67° C. is used. In the present embodiment normal heptane, the preferred paraffin, was used. The entraining agent should have a boiling pont of at least 35° C. above that of methyl formate.

Other paraffinic hydrocarbons suitable for use as entraining agents in column 38 include both individual paraffins having from 6 to 18 carbon atoms and mixtures thereof. Exemplary paraffins include straight chain paraffins such as hexane, octane, nonane, decane, dodecane, pentadecane and octadecane. Suitable branch chain isomers of paraffins boiling above n-hexane include 2- and 3-methyl hexanes, 2,2-, 2,4- and 3,3-dimethyl pentanes, 3-ethyl pentane, 2,2,3-trimethyl butane, 2,2,3,3-tetramethyl butane, 2,2,3-, 2,2,4-, 2,3,3- and 2,34-trimethyl pentanes, 2-methyl-2-ethyl pentane, 2,3-dimethyl hexane, 3,4-dimethyl pentane, 2-, 3- and 4-methyl heptanes, 2-methyl nonane, 2,6-dimethyl octane, 2,4,5,7-tetramethyl octane and the like.

In addition to straight and branch chain paraffins, mixtures of such paraffins are suitable herein. For example, various paraffinic naphthas are suitable. Typical paraffinic naphthas include selected fractions of straight-run gasolines and kerosenes. Other paraffinic naphthas include selected hydrogenated fractions of polygas and other low molecular weight propylene polymers (e.g., propylene tetramers and pentamers), as well as selected hydrogenated and alkylated fractions of naphthas obtained from thermal cracking and catalytic cracking of gas oils. Still other paraffinic naphthas include selected fractions of Udex raffinates (derived from solvent extractions using, e.g., diethylene glycol, from various reforming operations). For example, a particularly suitable paraffinic naphtha useful as entraining agent in the extractive distillation separation of propylene oxide from methyl formate is a $C_7$-$C_8$ fraction of Udex raffinate. The paraffinic naphthas used herein may contain small amounts of naphthenes, olefins and aromatics derived from reforming operations without adverse effects; however, for best results these associated hydrocarbons should not exceed about 15 weight percent based on said naphtha.

The selection of a particular paraffinic hydrocarbon entraining agent will depend primarily upon the boiling points of the particular epoxide and oxygenated impurities associated therewith.

As noted above, the acyclic paraffinic hydrocarbons suitable as extractants in column 38 are those having a boiling point at least 35° C. higher than the boiling point of the particular impurity(s) boiling within 5° C. of the olefin oxide in a crude mixture containing oxygenated impurities. These hydrocarbons, moreover, should boil at no less than 67° C. In general, the upper boiling point of hydrocarbon solvents used is limited only by pratical engineering considerations. A preferred boiling point range for hydrocarbons used herein is from 67° C. to 250° C.

Use of the entraining agents as defined herein in the extractive distillation separation of olefin oxides has numerous superior features, e.g., increased separation enhancement, ease of separation of the olefin oxide from the entraining agent, freedom from corrosion problems and economy.

In a typical operation, the crude feed containing the olefin oxide to be separated and purified and oxygenated impurities associated therewith is fed to an intermediate point of the extractive distillation column. The paraffinic hydrocarbon entraining agent is fed to a higher region of the column. The column is heated by means of a reboiler at the base thereof. The overhead vapors from the column comprise essentially all of the oxygenated impurities boiling within 5° C. of the olefin oxide. These vapors are condensed and refluxed to the column while a portion is removed as distillate product. Bottoms from the column comprising essentially the paraffinic hydrocarbon entraining agent containing the olefin oxide are withdrawn through a reboiler and fed to an olefin oxide refining column where the olefin oxide is stripped from the entraining agent and taken overhead in purified form. The entraining agent is removed as bottoms from the olefin oxide refining column and continuously recycled to the extractive distillation column.

The ratios of paraffinic hydrocarbon to crude feed are not critical herein and may be varied considerably. For example, ratios of 1:1 to 15:1 may suitably be used, although ratios within the range of 5:1 to 10:1 are preferred.

Temperatures and pressures used in the extractive distillation column may be varied over wide ranges. In general, temperatures at the reboiler should be such that the olefin oxide content in the entraining agent withdrawn as bottoms will be maintained at a maximum. Preferably, the column is operated at atmospheric pressures although subatmospheric and superatmospheric pressures may also be used.

In the present embodiment, the entraining agent, normal heptane (weight solvent ratio=9.5) was fed to column 38 through line 39. Methyl formate and acetaldehyde were removed overhead through line 40 to distillation column 32 for separation of these two compounds. Column 32 was heated to about 22° C. at the top and 35° C. at the bottom. This column had 45 plates and used a reflux ratio of 7.5 under a pressure of 15 p.s.i.a. Methyl formate was removed as bottoms and acetaldehyde was taken overhead and recycled through line 36 to reactor 11.

Bottoms from the extractive distillation column 38 containing propylene oxide dissolved in normal heptane were removed through line 41 to distillation column 42 for propylene oxide refining. Column 42 was heated to about 35° C. at the top and about 100° C. at the bottom. This column had twenty-five plates and operated at a reflux ratio of 5.0 under a pressure of 15 p.s.i.a. Heptane was withdrawn from the bottom and recycled via line 43 to extractive distillation column 38. Propylene oxide of 99+% purity was withdrawn through line 48 as a final product.

Although the present embodiment describes an extractive distillation separation of methyl formate and propylene oxide, it is contemplated that this separation can also be accomplished by other means such as solvent extraction, azeotropic distillation, adsorption and desorption, complex formation, etc., while making necessary modifications to recover the propylene oxide and methyl formate.

Turning now to the recovery of other valuable oxygenated products, reference is made to the bottoms stream 50 from primary products splitter 26. This stream contained all of the solvent taken overhead from the flasher-stripper let-down system, acid values, water, intermediate values not removed in the primary products splitter side stream, including methanol, methyl acetate, acetone, isopropanol, allyl alcohol, biacetyl and others, various high boiling components including acetonyl acetate, propylene glycol and various esters thereof such as propylene glycol monoacetate, propylene glycol monoformate and propylene glycol acetate formate and a small amount of residue. Bottoms stream 50 was fed to solvent-acids splitter 51. From this column, which had 10 plates and operated at about 105° C. at the top and 192° C. at the bottom under 15 p.s.i.a. pressure and using a reflux ratio of 3, all of the solvent and high boiling components were removed as bottoms and fed to a solvent treater system which is described below. The overhead product from splitter 51 containing all acid values, all the water and all the intermediate boiling components was passed to distillation column 54 where the intermediate boiling components, a small amount of water and traces of low boilers and high boilers were recovered overhead.

Bottoms from column 54 containing about 74% acetic acid, about 8.5% formic acid, about 6.5% water and traces of other components were directed through line 56 to azeotropic distillation column 57. This column contained about 70 trays and operated about 77° C. at the top and 125° C. at the bottom under 15 p.s.i.a. pressure. Benzene was used as an azeotrope-former and was fed through line 61 to the column at a point above the top tray at a ratio of 9 parts by weight of benzene for each part of overhead product from the column. Uniquely, in this system benzene forms two distinct azeotropic mixtures; one with water and one with formic acid, rather than a ternary azeotrope of these three components. In operation, a benzene-water azeotrope and a benzene-formic acid azeotrope were removed overhead through line 58 to a condenser (circulating water). Upon condensing, a mixture of benzene, water and formic acid were passed to collector 59 wherein the mixture separated into an upper benzene phase and a lower phase containing about 42% water, 55% formic acid and about 3% acetic acid. The latter components were removed from the bottom of the collector while benzene from the upper phase (replenished with make-up benzene through line 60) was recycled to the azeotropic distillation column.

Meanwhile, acetic acid was removed as the bulk of the bottoms (over 86 weight percent) from this column together with small amounts of some intermediate and higher boiling components to an acetic acid refining column 63 having 40 trays and operated at about 118° C. at the top and 130° C. at the bottom under 15 p.s.i.a. pressure and a reflux ratio of 5.0. Purified acetic acid was recovered overhead.

Returning now to the bottoms stream 52 from solvent-acids splitter 51; this stream contained about 90% propylene glycol diesters, mainly the diacetate (about 88%) and a small amount of acetate formate (about 2%); and the balance primarily propylene glycol and its monoesters, propylene glycol monoacetate and monoformate together with a small amount of acetonyl acetate and residue. This stream was fed to distillation column 66 having 50 trays and operated at temperatures of 186° C. at the top and 195° C. at the bottom and using a reflux ratio of 7.0. Bottoms from this column contained over 97% of the propylene glycol diesters useful as solvents in the oxidation reaction and the balance essentially residue. This stream was combined with the bottoms 19 from stripper 18 and fed to the absorber 20 and then recycled to the oxidation reactor 11 by way of line 44 from the absorber bottoms. This absorber bottoms stream contained about 29% by weight of residue upon entering the reactor. The conditions of reaction in this embodiment had previously been adjusted to provide for the extinction of excess residue over the approximately 26% by weight residue in the reactor effluent resulting when operating to produce the predetermined product distribution of this example.

The overhead from column 66, concentrated to about 20% by weight with oxidatively unstable propylene glycol, its monoesters and acetonyl acetate, was fed through line 67 to reactor 68 for acid-catalyzed (toluenesulfinic acid) esterification and transesterification of the above components to useful propylene glycol diesters. Other suitable acid catalysts for this esterification reaction include naphthalene-sulfonic acid and xylenesulfonic acid. Before entering the esterification reactor stream 67 was combined with stream 74 which contained a mixture of the bottoms stream 64 from the acetic acid refining column 63 and a side stream from the bottoms of the water-formic acid removal column 57, thus assuring an excess of acetic acid for the esterification reaction. This combined stream now contained about 61% of propylene glycol diesters, about 17% of the above mentioned unstable components and residue, about 21% acetic acid and the balance unidentified high boilers. This stream was then fed to reactor 68 which was operated at 170° C. under 15 p.s.i.a. pressure. Upon completion of the reaction the effluent stream contained about 70% of useful propylene glycol diesters (an increase of about 14 wt. percent of the amount fed to the reactor), about 6% of acetonyl acetate, propylene glycol and its monoesters (a decrease of about 62 wt. percent of the amount fed to the reactor), about 18% of acetic acid and the balance esterification by-products and stable high boilers.

The effluent stream 69 from esterifier 68 was fed to a solvent stripping column 70 having 20 plates and operating at 150° C. at the top and 200° C. at the bottom under 25 p.s.i.a. pressure and using a reflux ratio of 7.0. The overhead from this stripper, containing over 77% acetic acid, about 6% water and small amounts of formic acid, intermediate and higher boiling components were fed to the acid-intermediates column for further treatment, while the bottoms from the solvent stripper, enriched to about 92% of useful solvent diesters and the balance unstable components was recycled to the ester concentrator for conversion of the unstable components to stable solvent species and recycling of these useful stable solvent species to the absorber and, finally, the reactor.

In a typical oxidation according to the present embodiment feed materials were added to reactor 11 at approximately the following hourly rates: Propylene, 575 g., oxygen, 700 g. and solvent (e.g., propylene glycol diacetate), 8,465 g. At steady state (reactor residence time about 8.0 minutes) propylene conversion was about 26.5% and oxygen conversion was 99.9%. Among the primary oxidation products propylene oxide was obtained in about 41% yield and acetic acid about 12% yield, together with minor amounts of other oxygenated products. Actual propylene oxide-acetic acid molar ratio was 3.43.

Example 2

This example illustrates a modification of the above process wherein the hydrocarbon oxidation may be controlled to alter the ratios of the more important products on demand. In the foregoing example, the oxidation was controlled to yield a larger proportion of propylene oxide relative to acetic acid. In this example the propylene oxidation was controlled to yield a larger proportion of acetic acid relative to propylene oxide.

The procedure outlined in Example 1 was repeated except that the oxidation reaction was performed under conditions necessary to obtain a propylene oxide-acetic acid molar ratio of 1.22. The reaction was carried out at a temperature of 172° C. and 850 p.s.i.g. pressure using a propylene/oxygen feed ratio of 1.37. Solvent feed rate was 10,050 g./hr.

At steady state, reactor residence time about 8 minutes, propylene conversion was 39% and oxygen conversion over 99%. Propylene oxide yield was 24.1 mole percent and acetic acid yield 19.7 mole percent giving a P.O./acetic acid molar ratio of 1.22.

The residue content in the recycle solvent was about 35.5% by weight of the total stream. Under the above oxidation conditions, the amount of residue formed relative to that oxidized to acetic acid was in balance with the amount of residue required when operating to achieve the above P.O./acetic acid ratio. In this manner there can be no buildup of residue in the reactor to interfere with the course of the primary oxidation.

The reaction products obtained in this example, as in the preceding example, include useful intermediate boiling compounds such as acetone, methanol, methyl acetate, isopropanol, allyl alcohol and others. The utility of these intermediates was described earlier.

The preceding examples have illustrated advantageous propylene feedstock oxidations wherein propylene oxide and acetic acid were produced and recovered in predetermined ratios as the only primary products of the process, together with other useful by-products.

In the example below is illustrated a preferred embodiment of the present invention wherein propylene glycol is also obtained as a primary product of the process in addition to propylene oxide, acetic acid and other valuable products. Thus, the advantages and benefits accruing from the operations in the preceding examples are further multiplied and magnified, e.g., by increasing the range of product distributions and ratios, variety of useful products and overall process flexibility.

The process described in the following example features the integration of a novel propylene oxide hydrolysis system operating on one of the main product recovery streams.

Example 3

In this embodiment of the invention, the procedure described in Example 1 is repeated, except for the incorporation of a propylene oxide hydrolysis operation in the refining train for the products in the side stream from the primary products splitter.

In order to provide a better understanding of the present embodiment, reference is made to the side stream 27 from primary products splitter 26. This stream contains a variety of low and intermediate boiling components including propylene oxide, methyl formate, methyl acetate, acetaldehyde, propanol, methanol, allyl alcohol, isopropanol, acetone, water and others. As mentioned earlier the chief components of this stream comprises approximately 62% by weight propylene oxide, 10% methyl formate, 8% methyl acetate, 7% acetaldehyde and the balance distributed among the other products mentioned. Water in this stream amounts to less than 0.1% by weight based on the total stream.

This side stream is directed to intermediates removal column 28 as described earlier. However, in the present embodiment a portion of this side stream is fed through line 80 to hydrolyzer 81. This column is loaded with water at start-up and no additional water is needed to replace water removed from effluent streams since the column is operated in such manner that essentially no free water leaves the column. One advantage of the present operation is that by virtue of the particular components in the crude feed to the hydrolyzer, the hydrolysis is self-catalyzed, thus requiring no added catalysts. More particularly, methyl formate and methyl acetate in the feed are hydrolyzed to methanol and formic and acetic acids, respectively. This is a reversible reaction with the water and ester being in equilibrium with the alcohol and acid. At steady state, therefore, for each mole of ester fed to the column a mole of ester is removed from the column.

In a typical operation a side stream 27 in the drawing is removed from primary products splitter 26 at a rate of 523 g./hr. corresponding to the following composition (gram moles/hr.): acetaldehyde, 0.83; methyl formate, 0.89; propylene oxide, 5.57; methanol, 0.93; methyl acetate, 0.55; acetone, 0.52; water 0.24 and other intermediate boiling components, 0.79. This side stream is then split two ways: one-half of which is directed to intermediates removal column 28 through line 27 and one-half of which is directed through line 80 to a middle region of the propylene oxide hydrolyzer column 81. Thus, the crude feed to the hydrolyzer column is introduced at a rate of 261 g./hr. corresponding to a propylene oxide feed rate of 2.79 gram moles/hr. and feed rates of one-half the above values for the other components. Column 81 contains a plurality of trays and is heated to about 56° C. at the top and 219° C. at the bottom under pressures of about 15 p.s.i.g. at the top and 20 p.s.i.g at the bottom of the column and has a reflux ratio of about 100 to 1

The overhead product is refluxed to the top tray of the column, since in this general region of the column, but above the water level, most of the aforementioned intermediate boiling components, having boiling points between that of water and propylene oxide, form a buffer or cushion between these two compounds. In this manner any propylene oxide which is not hydrolyzed in the first pass through the column is prevented from further hydrolysis and is taken overhead along with intermediates and removed in a product take-off stream for recovery, thus enhancing process efficiency and product distributions.

In this embodiment about 60% of the propylene oxide fed to the hydrolyzer column is hydrolyzed to propylene glycol. Water of hydrolysis is made up through line 80. Unreacted propylene oxide is directed through a product take-off stream 85 at a rate of about 1.1 gram moles/hr. and recombined with the other portion of the primary products splitter sidestream 27 going into intermediates removal column 28. The recombined propylene oxide feed rate to column 28 is about 3.9 gram moles/hr.

In hydrolyzer 81, as mentioned, 60% of the propylene oxide fed to the column is hydrolyzed to glycols, primarily propylene glycol, together with lesser quantities of di- and tripropylene glycols. These glycols are removed as bottoms from the hydrolyzer at a rate of about 1.7 gram moles/hr. in a water-free condition. This bottoms stream is fed to a glycols separation column 88 operating at about 145° C. at the top and 210° C. at the bottom under 200 mm. pressure and a reflux ratio of 0.4. Propylene glycol is removed overhead at a rate of about 1.5 gram moles/hr., while tripropylene glycol is removed as bottoms. Dipropylene glycol is recovered by means of a side stripper column 91 operating at about 190° C. at the top and 200° C. at the bottom under 200 mm. pressure and a reflux ratio of 0.4. Feed to column 91 is from an upper middle side stream 92 of glycols separation column 88 with a recycle stream 93 near the middle of column 88.

For most purposes the total glycol stream 86 from hydrolyzer column 81 can be used without the necessity for separating individual glycols.

Primary advantages of the hydrolysis system just discussed are that: (1) the feed stream to the hydrolyzer can contain a large fraction of impurities, i.e., other compounds formed in the process besides the propylene oxide without interfering with the hydrolysis; (2) these other compounds, including some low boilers and some intermediate boilers, fed to the hydrolyzer with the propylene oxide serve two very useful functions in the hydrolyzer, visz., (a) they catalyze the hydrolysis, thus obviating the need of extraneous catalysts and (b) the intermediate boilers form a buffer zone between water in the hydrolyzer and propylene oxide refluxed to the top of the hydrolyzer, thus preventing refluxing to a hydrolysis zone and permitting some propylene oxide to pass overhead and be recovered as such; (3) because of the self-catalyzed nature of the hydrolysis lower temperatures and pressures can be used in the hydrolyzer; (4) because of the lower temperatures and pressures used in the hydrolyzer, all the water remains in the hydrolyzer, thus avoiding and thereby eliminating, additional columns to separate water from overhead and bottoms streams, and recycle water equipment; the only additional water required is make-up for water of hydrolysis; and (5) propylene glycols are obtained directly from the hydrolyzer in a water-free condition and can be used directly in utilities some of which are enumerated below.

In the present embodiment of the invention gross acetic acid production amounts to about 1.6 gram moles/hr., propylene glycols (including di-PG and tri-PG) about 1.7 gram moles/hr. and net propylene oxide production about 3.9 gram moles/hr. Thus propylene oxide:propylene glycols:acetic acid molar ratios of about 2.4:1.1:1 are obtained.

In the same manner ratios of these products can be obtained within the range of from about 0.5:1 to 5.5:1. Thus, the process can be operated in such manner as to produce such varying molar ratios (P.O.:P.G.:acetic acid) as 0.5:0.5:1; 0.5:1:1; 5.0:0.5:1; 1:1:1, etc. Thus the flexibility of obtaining variant ratios of valuable oxygenated compounds is manifest.

It will be noted that the present process can be controlled to produce much higher yields of propylene oxide, propylene glycol(s) and/or acetic acid than recited in the above example. For example, P.O. or P.G. yields up to about 55% or actic acid yields up to about 30% can be obtained. However, for most economical operation the process is preferably operated in such manner as to obtain the desired P.O.:P.G.:acetic acid ratio. Thus, in some instances the most desirable operation of the present process will result in lower P.O. and/or P.G. yields. However, these lower P.O. and/ or PG yields are off-set by lower operating costs and higher acetic acid yield, which is a highly desired result in a multi-product process.

The above examples illustrate the control and flexibility achieved by the instant hydrocarbon oxidation and product recovery system.

As further illustrations of the versatility of the instant invention are mentioned some of the utilities and interrelationships of the products of this invention.

For one thing solvent mechanical losses can be made up in several ways. It will be recalled that the preferred oxidation solvents of this invention are fully esterified polyacyl esters of polyols as described above, particularly vicinal diacyl esters of propylene glycol. According to the present process, portions of the product glycols and/or propylene oxide can be admixed and reacted with product acetic acid in the solvent treater described above to produce and recycle additional solvent to the oxidation reactor.

Another utility of the present process involves feeding a stream of propylene glycol(s) from the bottom of hydrolyzer 81 to line 67 going into solvent treater 68. Acetic acid and formic acid from columns 63 and 57, respectively, are used to esterify (partially or completely) these glycols in solvent treater 68. The esterified products are recycled to ester concentrator 68 where an overhead product take-off stream removes propylene glycol monoesters and diesters from the system and which are excellent solvents for many substances, e.g., for paints, varnishes, shellacs, copals, pyroxylin, etc. As described above, however, propylene glycol and its monoesters are deleterious components in the primary oxidation described herein, hence, these materials must not be recycled to the reactor in any significant quantity.

While the invention has been specifically described with reference to the oxidation of propylene and recovery of valuable oxygenated products including propylene oxide, propylene glycol, acetic acid, acetaldehyde, methyl formate, etc., it is within the purview of the invention to utilize the above-described and illustrated system for the oxidation of other olefinic compounds and recovery of oxygenated products corresponding to or similar to those described above. It being understood that process conditions, e.g., temperatures and pressures in the reactor, flasher, stripper, columns, etc. will be modified accordingly to make the necessary separations.

Other olefins suitable for use herein preferably include those of the ethylenic and cycloethylenic series up to 8 carbon atoms per molecule, e.g., ethylene, propylene, butenes, pentenes, hexenes, heptenes and octenes; cyclobutenes, cyclopentenes, cyclohexenes, cyclooctenes, etc. Of particular interest, utility and convenience are acyclic olefins containing from 2 to 8 carbon atoms. Included are the alkyl-substituted olefins such as 2-methyl-1-butene, 2-methyl-2-butene, 2-methyl-propene, 4-methyl-2-pentene, 2,3-dimethyl-2-butene and 2-methyl-2-pentene. Other suitable olefinic compounds include dienes such as butadiene, isoprene, other pentadienes and hexadienes; cyclopentenes, cyclohexenes, cyclopentadiene, vinyl-substituted cycloalkenes and benzenes, styrene, methylstyrene, and other vinyl-substituted aromatic systems.

It is to be understood that the foregoing detailed description is merely illustrative of the invention and that many variations will occur to those skilled in the art without departing from the spirit and scope of this invention.

I claim:

1. Process for the production of oxygenated organic compounds which comprises oxidizing propylene feedstocks with molecular oxygen in a solvent selected from the group consisting of fully esterified polyacyl esters of polyhydroxyalkanes, polyhydroxycycloalkanes, polyglycols and mixtures thereof, wherein said esters contain from 1 to 18 carbon atoms in each acyl moiety and from 2 to 18 carbon atoms in each alkylene and cycloalkylene moiety, under temperatures and pressures sufficient to cause the reaction to proceed in the liquid phase and recovering said oxygenated products by:

(a) directing an effluent stream of the reaction mixture from a reaction zone through a combination letdown distillation zone comprising a flashing zone followed by a stripping zone, said flashing zone and stripping zone being maintained at pressures substantially lower than in each preceding zone and at temperatures necessary to separate substantially all of the low and intermediate boiling products overhead as gas phase and higher boiling components including the bulk of the solvent and polymeric residue having a boiling point above that of said solvent which are removed as bottoms from said stripping zone, (b) passing said overhead gas phase to condensing zones, from whence uncondensed gases are directed to an absorbing zone into which the bottoms stream from said stripping zone is also passed to absorb uncondensed propylene, propane and minor amounts of oxygenated components; removing vent gases overhead from said absorber, while feeding the bottoms stream from said absorbing zone back to said reaction zone, (c) adjusting reaction conditions in such manner that at steady state the polymeric residue content in the bottoms stream from said absorbing zone going into said reaction zone is approximately equivalent to the polymeric residue content in said effluent stream for a predetermined product distribution, (d) feeding a combined stream of condensed liquids from said condensing zones into a primary products distillation splitting zone from which an overhead stream containing propylene and propane are removed to a distillation splitter for these components, the propane being removed as bottoms while propylene is removed overhead and recycled to said reaction zone, (e) directing a sidestream from said primary products distillation splitting zone to an intermediates removal distillation zone from which a bottoms stream containing methyl acetate, acetone, methanol and other intermediate boilers are removed, (f) feeding the overhead from said intermediates removal distillation zone to an atmospheric extractive distillation zone using a hydrocarbon solvent boiling above 67° C. as extracture solvent and from which propylene oxide dissolved in said hydrocarbon solvent is removed as bottoms and fed to a distillation refining column wherein purified propylene oxide is recovered overhead and said hydrocarbon is removed as bottoms and recycled to said extractive distillation zone, (g) feeding the overhead from said extractive distillation zone to a methyl formate-acetaldehyde distillation separation zone wherein methyl formate is removed as bottoms and acetaldehyde is taken overhead and recycled to said reaction zone, (h) feeding the bottoms from said primary products distillation splitting zone in step (d) to an acid-solvent distillation splitting zone wherein substantially all higher boiling components are removed as bottoms, and all acid values, water and intermediate boilers are removed overhead and fed to an acid-intermediates distillation zone from which the intermediates are recovered overhead, while directing the bottoms containing acid valves and water to an azeotropic distillation column using benzene as an azeotrope-former for water and formic acid.

(i) removing from said azeotropic distillation zone an overhead stream containing a mixture of benzene-water and benzene-formic acid azeotropes to a condensing zone wherein benzene is separated from water and formic acid and feeding these three components to a collecting zone in which benzene forms an upper phase from which benzene is returned to said azeotropic distillation zone, while water and formic acid are removed as a lower phase, while removing from said azeotropic distillation zone a bottoms stream containing acetic acid to a distillation refining zone wherein purified acetic acid is recovered overhead, (j) feeding the bottoms from said acid-solvent distillation splitter in step (h) containing major amounts of solvent from said reaction zone, minor amounts of propylene glycol and monoesters thereof to an ester concentration zone from which some of said solvent substantially depleted of said propylene glycol and its monoesters is removed as bottoms and recycled to said reaction zone, while removing an overhead stream comprised of the rest of said solvent now enriched with said propylene glycol and its monoesters, (k) feeding the overhead from said ester concentration zone together with monocarboxylic acid values to an esterification zone wherein propylene glycol and its monoesters are esterified to propylene glycol diesters, (l) feeding an effluent stream from said esterification zone comprising increased amounts of said diesters, decreased amounts of said acid values and unreacted propylene glycol and its monoesters to a solvent distillation stripping zone wherein said acid values are removed overhead and recycled to said acid-intermediates distillation separation zone in step (h) and said diesters and any unreacted propylene glycol and its monoesters are removed as bottoms and recycled to said ester concentration zone, (m) feeding a fraction of said side stream in step (e) containing propylene oxide and other oxygenated organic components having boiling points between that of propylene oxide and water to a hydrolysis zone wherein propylene oxide is hydrolyzed to propylene glycol (s) which is removed as bottoms free of water, while unreacted propylene oxide and said other oxygenated components are withdrawn as overhead product free of water and refluxed to a region of said hydrolysis zone below which said other oxygenated components form a barrier between water of hydrolysis and propylene oxide, and (n) feeding a portion of said overhead product in step (m) to said side stream going to said intermediates removal zone.

2. Process according to claim 1 wherein said bottoms in step (m) is fed to a glycols separation distillation zone from which propylene glycol is taken overhead and tripropylene glycol is removed as bottoms, while dipropylene glycol is removed overhead from a side stream distillation stripping zone.

3. Process according to claim 1 wherein said solvent comprises a vicinal diacyl ester of a polyhydroxyalkane.

4. Process according to claim 3 wherein said solvent comprises propylene glycol diacetate.

5. Process according to claim 1 wherein said oxidation occurs at temperatures within the range of from 50° C. to 400° and pressures within the range of from 0.5 atmospheres to 350 atmospheres.

6. Process according to claim 5 wherein said oxidation occurs in the absence of added catalysts.

7. Process according to claim 1 wherein propylene oxide:propylene glycol:acetic acid molar ratios are obtained within the range of from 0.5:1 to 5.5:1.

8. Process for the production of propylene oxide which comprises oxidizing propylene feedstocks with molecular oxygen in a solvent selected from the group consisting of fully esterified polyacyl esters of polyhydroxyalkanes, polyhydroxycycloalkanes, polyglycols and mixtures thereof, wherein said esters contain from 1 to 18 carbon atoms in each acyl moiety and from 2 to 18 carbon atoms in each alkylene and cycloalkylene moiety under temperatures and pressures sufficient to cause the reaction to proceed in the liquid phase and recovering said oxygenated products by:

(a) directing an effluent stream of the reaction mixture from a reaction zone through a combination let-down distillation zone comprising a flashing zone followed by a stripping zone, said flashing zone and stripping zone being maintained at pressures substantially lower than in each preceding zone and at temperatures necessary to separate substantially all of the low and intermediate boiling products overhead as gas phase and higher boiling components including the bulk of the solvent and polymeric residue having a boiling point above that of said solvent which are removed as bottoms from said stripping zone, (b) passing said overhead gas phase to condensing zones, from whence uncondensed gases are directed to an absorbing zone into which the bottom stream from said stripping zone is also passed to absorb uncondensed propylene, propane and minor amounts of oxygenated components; removing vent gases overhead from said absorber, while feeding the bottoms stream from said absorbing zone back to said reaction zone, (c) adjusting reaction conditions in such manner that at steady state the polymeric residue content in the bottoms stream from said absorbing zone going into said reaction zone is approximately equivalent to the polymeric residue content in said effluent stream for a predetermined product distribution.

(d) feeding a combined stream of condensed liquids from said condensing zones into a primary products distillation splitting zone from which an overhead stream containing propylene and propane are removed to a distillation splitter for these components, the propane being removed as bottoms while propylene is removed overhead and recycled to said reaction zone, (e) directing a sidestream from said primary products distillation splitting zone to an intermediate removal distillation zone from which a bottoms stream containing methyl acetate, acetone, methanol and other intermediate boilers are removed, (f) feeding the overhead from said intermediates removal distillation zone to an atmospheric extractive distillation zone using a hydrocarbon solvent boiling above 67° C. as extractive solvent and from which propylene oxide dissolved in said hydrocarbon solvent is removed as bottoms and fed to a distillation refining column wherein purified propylene oxide is recovered overhead and said hydrocarbon is removed as bottoms and recycled to said extractive distillation zone, (g) feeding the overhead from said extractive distillation zone to a methyl formate-acetaldehyde distillation separation zone wherein methyl formate is removed as bottoms and acetaldehyde is taken overhead and recycled to said reaction zone, (h) feeding the bottoms from said primary products distillation splitting zone in step (d) to an acid-solvent distillation splitting zone wherein substantially all higher boiling components are removed as bottoms and all acid values, water and intermediate boilers are recovered overhead.

(i) feeding the bottoms from said acid-solvent distillation splitter in step (h) containing major amounts of solvent from said reaction zone, minor amounts of propylene glycol and monoesters thereof to an ester concentration zone from which some of said solvent substantially depleted of said propylene glycol and its monoesters is removed as bottoms and recycled to said reaction zone, while removing an overhead stream comprised of the rest of said solvent now enriched with said propylene glycol and its monoesters, (j) feeding the overhead from said ester concentration zone together with monocarboxylic acid values to an esterification zone wherein propylene glycol and its monoesters are esterified to propylene glycol diesters, (k) feeding an effluent stream from said esterification zone comprising increased amounts of said diesters, decreased amounts of said acid values and unreacted propylene glycol and its monoesters to a solvent stripping distillation zone wherein said acid values are recovered overhead and said diesters and any unreacted propylene glycol and its monoesters are removed as bottoms and recycled to said ester concentration zone, (l) feeding a fraction of said side stream in step (e) containing propylene oxide and other oxygenated organic components having boiling points between that of propylene oxide and water to a hydrolysis zone wherein propylene oxide is hydrolyzed to propylene glycol(s) which is removed as bottoms free of water, while unreacted propylene oxide and said other oxygenated components are withdrawn as overhead product free of water and refluxed to a region of said hydrolysis zone below which said other oxygenated components form a barrier between water of hydrolysis and propylene oxide and (m) feeding a portion of said overhead product in step (l) to said side stream going to said intermediates removal distillation zone.

9. Process according to claim 8 wherein said bottoms in step (l) is fed to a glycols separation distillation zone from which propylene glycol is taken overhead and tripropylene glycol is removed as bottoms, while dipropylene glycol is removed overhead from a side stream distillation stripping zone.

10. Process according to claim 8 wherein said solvent comprises a vicinal diacyl ester of a polyhydroxyalkane.

11. Process according to claim 10 wherein said solvent comprises propylene glycol diacetate.

12. Process according to claim 8 wherein said oxidation occurs at temperatures within the range of from 50° C. to 400° C. and pressures within the range of from 0.5 to 350 atmospheres.

13. Process according to claim 12 wherein said oxidation occurs in the absence of added catalysts.

References Cited

UNITED STATES PATENTS

| | | | |
|---|---|---|---|
| 1,813,636 | 7/1931 | Petersen et al. | 203—69 |
| 2,224,984 | 12/1940 | Potts et al. | 203—88 |
| 2,985,668 | 3/1962 | Shingu | 260—533 |
| 3,024,170 | 3/1963 | Othmer et al. | 203—67 |
| 3,071,601 | 1/1963 | Aries | 260—533 |
| 3,153,058 | 10/1964 | Sharp et al. | 260—348.5 |

NORMAN YUDKOFF, *Primary Examiner.*

WILBUR L. BASCOMB, JR., *Examiner.*